(12) United States Patent
Choi et al.

(10) Patent No.: US 12,040,844 B2
(45) Date of Patent: Jul. 16, 2024

(54) DEVICE AND METHOD OF ESTIMATING OUTPUT POWER OF ARRAY ANTENNA

(71) Applicant: SAMSUNG ELECTRONICS CO., LTD., Suwon-si (KR)

(72) Inventors: Dooseok Choi, Suwon-si (KR); Youngki Lee, Suwon-si (KR); Joonhoi Hur, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 57 days.

(21) Appl. No.: 18/055,921

(22) Filed: Nov. 16, 2022

(65) Prior Publication Data

US 2023/0163866 A1   May 25, 2023

(30) Foreign Application Priority Data

Nov. 23, 2021 (KR) .................. 10-2021-0162792
Jun. 8, 2022 (KR) .................. 10-2022-0069577

(51) Int. Cl.
*H04B 17/12* (2015.01)
*H04B 17/10* (2015.01)

(52) U.S. Cl.
CPC ........... *H04B 17/12* (2015.01); *H04B 17/102* (2015.01)

(58) Field of Classification Search
CPC ...... H04B 17/12; H04B 17/102; H04B 17/13; H04B 17/14; H04B 17/21; H04B 17/318; H04B 17/103; H04B 17/20; H04W 24/08
USPC ....................................................... 455/115.3
See application file for complete search history.

(56) References Cited

U.S. PATENT DOCUMENTS

| | | | |
|---|---|---|---|
| 7,007,176 B2 | 2/2006 | Goodfellow et al. | |
| 7,031,669 B2 | 4/2006 | Vaidyanathan et al. | |
| 9,634,638 B2 | 4/2017 | Higaki et al. | |
| 9,806,746 B2 | 10/2017 | Whittaker | |
| 10,153,731 B2 | 12/2018 | Thyagarajan et al. | |
| 11,038,546 B2 | 6/2021 | Choi et al. | |
| 11,075,703 B2 | 7/2021 | Kim et al. | |
| 11,165,397 B2 | 11/2021 | Arfaei et al. | |
| 2004/0166808 A1* | 8/2004 | Hasegawa ............ | H01Q 3/2605 455/562.1 |
| 2012/0077450 A1* | 3/2012 | Cohen ................... | H04B 17/14 455/115.3 |
| 2014/0355467 A1* | 12/2014 | Seol ..................... | H04B 7/0686 370/278 |
| 2016/0233580 A1 | 8/2016 | Aparin et al. | |
| 2019/0165736 A1* | 5/2019 | Khesbak ............... | H03F 1/0266 |

(Continued)

FOREIGN PATENT DOCUMENTS

JP         4686265       5/2011
KR   10-2021-0058605   5/2021

*Primary Examiner* — Don N Vo
(74) *Attorney, Agent, or Firm* — F. CHAU & ASSOCIATES, LLC

(57) ABSTRACT

A wireless communications device may include a controller configured to, in a calibration mode, obtain a first output value of a first power detector after setting a first power amplifier to a first gain and obtain a second output value of the first power detector after setting the first power amplifier to a second gain, wherein the controller may estimate, in a normal mode, output power of a first antenna from an output value of the first power detector, based on a correction coefficient calculated using the first output value and the second output value.

20 Claims, 15 Drawing Sheets

(56) References Cited

U.S. PATENT DOCUMENTS

2020/0076515 A1* 3/2020 Jain ................. G06F 1/3206
2021/0167870 A1   6/2021 Zhuang et al.

* cited by examiner

FIG. 9

| Antenna | Correction Coefficient |
|---------|------------------------|
| A1 | $C_1$ |
| A2 | $C_2$ |
| A3 | $C_3$ |
| A4 | $C_4$ |

FIG. 11

| Antenna | Beam Steering | Correction Coefficient |
|---|---|---|
| A1 | $\theta_1$ | $C_{11}$ |
|  | ⋮ | ⋮ |
|  | $\theta_n$ | $C_{1n}$ |
| ⋮ | ⋮ | ⋮ |
| A4 | $\theta_1$ | $C_{41}$ |
|  | ⋮ | ⋮ |
|  | $\theta_n$ | $C_{4n}$ |

DEVICE AND METHOD OF ESTIMATING OUTPUT POWER OF ARRAY ANTENNA

CROSS-REFERENCE TO RELATED APPLICATIONS

This application is based on and claims priority under 35 U.S.C. § 119 to Korean Patent Application No. 10-2021-0162792, filed on Nov. 23, 2021, and Korean Patent Application No. 10-2022-0069577, filed on Jun. 8, 2022, in the Korean Intellectual Property Office, the disclosures of which are incorporated by reference herein in their entireties.

TECHNICAL FIELD

This disclosure relates generally to wireless communications, and more particularly, to a device and a method of estimating output power of an array antenna.

DISCUSSION OF RELATED ART

To increase data throughput in wireless communication, extended frequency bands may be used, such that wireless communication devices may require a capability of processing signals with high frequencies. For example, allocation of 5-th generation (5G) millimeter wave (mmWave) frequencies, which are defined by the 3rd Generation Partnership Project (3GPP), includes high frequency bands of 20 GHz or higher. Signals with such high frequencies, however, have high transmission loss in free space, reducing receive power at the receiving device.

To alleviate this problem, array antennas at the transmitting device may be used to increase antenna gain and thereby compensate for the high transmission loss. A tradeoff exists, however, between the amount of output power and power consumption/heat emission at the transmitting device. Therefore, it is desirable to reduce output power when a lower output power will suffice for a particular communication environment. To this end, it is desirable to accurately measure the output power dynamically.

SUMMARY

Embodiments of the inventive concept provide a device and method of accurately estimating output power of an array antenna.

According to an aspect of the inventive concept, there is provided a wireless communications device including an array antenna, which includes a plurality of antennas, a plurality of power amplifiers including a first power amplifier configured to drive a first antenna of the plurality of antennas, a plurality of power detectors including a first power detector configured to detect output power of the first power amplifier, and a controller configured to, in a calibration mode, obtain a first output value of the first power detector after setting the first power amplifier to a first gain and obtain a second output value of the first power detector after setting the first power amplifier to a second gain, while the plurality of antennas are respectively driven by the plurality of power amplifiers, wherein the controller may estimate, in a normal mode, output power of the first antenna from an output value of the first power detector, based on a correction coefficient calculated using the first output value and the second output value.

According to another aspect of the inventive concept, there is provided a wireless communication method through an array antenna, the wireless communication method including controlling, in a calibration mode, a plurality of power amplifiers such that a plurality of antennas included in the array antenna are driven, in the calibration mode, setting a first power amplifier, which drives a first antenna from among the plurality of antennas, to a first gain and generating a first output value by detecting output power of the first power amplifier, in the calibration mode, setting the first power amplifier to a second gain and generating a second output value by detecting the output power of the first power amplifier, in a normal mode, generating a third output value by detecting the output power of the first power amplifier, and estimating, in the normal mode, output power of the first antenna from the third output value, based on a correction coefficient calculated using the first output value and the second output value.

According to yet another aspect of the inventive concept, there is provided a method of generating a correction coefficient used for estimating output power of an array antenna, the method including, in a calibration mode: driving a plurality of antennas included in the array antenna respectively by a plurality of power amplifiers included in a device including the array antenna; setting a first power amplifier from among the plurality of power amplifiers to respectively a first gain and a second gain; obtaining a first output value and a second output value respectively corresponding to the first gain and the second gain by detecting output power of the first power amplifier; obtaining a first measurement value and a second measurement value respectively corresponding to the first gain and the second gain by measuring the output power of the array antenna; calculating a correction coefficient, based on the first output value, the second output value, the first measurement value, and the second measurement value; and storing the correction coefficient in the device.

According to another aspect, a wireless communications device includes an array antenna comprising a plurality of antennas; a plurality of power amplifiers, including a first power amplifier configured to drive a first antenna of the plurality of antennas; a plurality of power detectors, including a first power detector configured to detect output power of the first power amplifier; a memory; and a controller configured to execute operations of the wireless device in a normal mode during communications with a second wireless communications device. The operations include estimating output power of the first antenna from an output value of the first power detector, based on a correction coefficient stored in the memory, wherein the correction coefficient is a coefficient previously calculated using a first output value and a second output value of the first power detector, the first and second output values obtained in a calibration mode with the first power amplifier set to first and second gains, respectively, while the plurality of antennas are respectively driven by the plurality of power amplifiers.

BRIEF DESCRIPTION OF THE DRAWINGS

Embodiments of the inventive concept will be more clearly understood from the following detailed description taken in conjunction with the accompanying drawings in which:

FIG. 9 is a diagram illustrating an example of a correction coefficient according to an example embodiment;

FIG. 11 is a diagram illustrating an example of a correction coefficient according to an example embodiment.

DETAILED DESCRIPTION OF EMBODIMENTS

Figure 1:
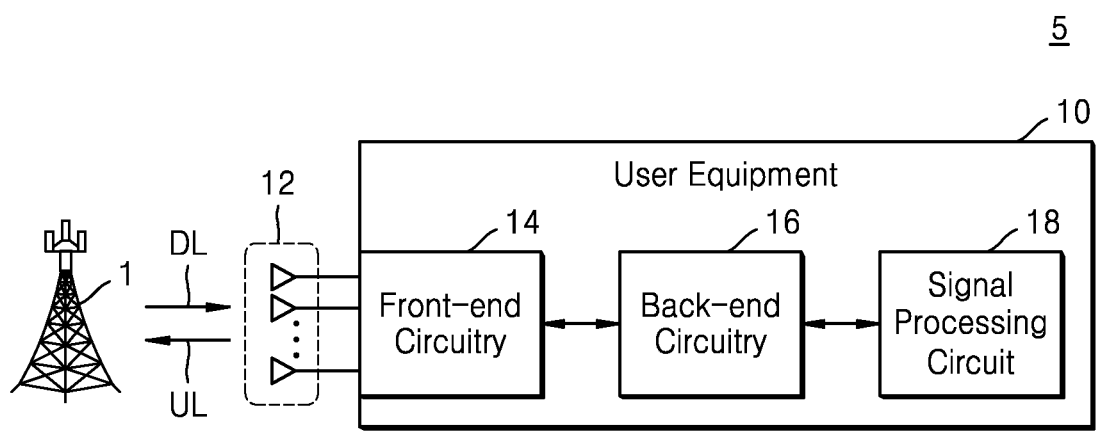
FIG. 1 is a diagram illustrating a wireless communication system according to an example embodiment.

FIG. 1 is a diagram illustrating a wireless communication system 5 according to an example embodiment. Some examples of the wireless communication system 5 include a cellular network, such as a 5th generation wireless (5G) system, a Long Term Evolution (LTE) system, an LTE-Advanced system, a Code Division Multiple Access (CDMA) system, or a Global System for Mobile Communications (GSM) system, a Wireless Personal Area Network (WPAN) system. Hereinafter, although descriptions will be made with main reference to a wireless communication system using a cellular network, it will be understood that embodiments of the inventive concept are not limited thereto and may be applied to any suitable wireless communication system.

A base station 1 may generally refer to a fixed station communicating with a user equipment and/or another base station and may exchange data and control information by communicating with the user equipment and/or the other base station. For example, the base station 1 may be referred to as a Node B, an evolved-Node B (eNB), a next generation Node B (gNB), a sector, a site, a base transceiver system (BTS), an access point (AP), a relay node, a remote radio head (RRH), a radio unit (RU), a small cell, or the like. As used herein, the term "base station" or "cell" may have a comprehensive meaning representing some areas or functions covered by a base station controller (BSC) in CDMA, a Node-B in WCDMA, an eNB in LTE, a gNB of 5G, a sector (site), or the like, and may include all various coverage areas, such as megacell, macrocell, microcell, picocell, femtocell, relay node, RRH, RU, and small cell communication ranges.

A user equipment 10 may refer to any wireless communications equipment, which may be stationary or mobile and may transmit and/or receive data and/or control information by wirelessly communicating with a base station, for example, the base station 1. For example, the user equipment 10 may be referred to as a terminal, a terminal equipment, a mobile station (MS), a mobile terminal (MT), a user terminal (UT), a subscriber station (SS), a wireless device, a handheld device, or the like. Hereinafter, although embodiments of the inventive concept will be described by mainly taking the user equipment 10 as a wireless communication device for reference, it will be understood that embodiments of the inventive concept are not limited thereto.

A wireless communication network between the user equipment 10 and the base station 1 may support a large number of users to communicate with each other by sharing available network resources. For example, in the wireless communication network, information may be transferred by various multiple access schemes, such as CDMA, Frequency Division Multiple Access (FDMA), Time Division Multiple Access (TDMA), Orthogonal Frequency Division Multiple Access (OFDMA), Single Carrier Frequency Division Multiple Access (SC-FDMA), OFDM-FDMA, OFDM-TDMA, OFDM-CDMA, and the like. As shown in FIG. 1, the user equipment 10 may communicate with the base station 1 through an uplink (UL) and a downlink (DL). In some embodiments, as in Device-to-Device (D2D) communication, user equipments may communicate with each other through a sidelink. As shown in FIG. 1, the user equipment 10 may include an array antenna 12, front-end circuitry ("module") 14, back-end circuitry ("module") 16, and signal processing circuit 18. In some embodiments, the array antenna 12, the front-end module 14, and the back-end module 16 may be embedded in one antenna module.

The array antenna 12 may include a plurality of antennas (interchangeably, "antenna elements") and may be connected to the front-end module 14. The array antenna 12 may be used for various purposes such as spatial diversity, polarization diversity, spatial multiplexing, beamforming, or the like. Each of the plurality of antennas in the array antenna 12 may include any suitable type of antenna, for example, a patch antenna, a dipole antenna, or the like.

To increase throughput, high microwave and millimeter wave (mmWave) frequencies such as the Frequency Range 2 (FR2) band (24.25 GHz to 52.6 GHz) may be selected for communication. MmWave frequencies, as well as a higher range of microwave frequencies, have high transmission loss in free space. Note that microwave frequencies are often defined as frequencies in the range of 300 MHz to 300 GHz whereas mmWave frequencies are often defined as frequencies in the range of 30 GHz to 300 GHz. Embodiments herein are applicable to any frequency at which it is desirable to accurately measure array antenna output power. For high transmission loss cases, to compensate for the high transmission loss, the user equipment 10 may include the array antenna 12 that increases antenna gain, and may achieve a target or requisite effective isotropically radiated power (EIRP) through the array antenna 12. Meanwhile, the amount of transmission power needed may depend on the UL channel state: when the UL channel state is poor, high transmission power may be required, but low transmission power may suffice when the UL channel state is good. However, since high transmission power may increase the power consumption of the user equipment 10, it is desirable to optimize transmission power to achieve high efficiency of the user equipment 10. In other words, it may be desirable to limit the transmission power to that which is satisfactory (but not excessive) for the current UL channel condition. Herein, the transmission power, which is the power radiated by the array antenna 12 (e.g., defined by EIRP), may be referred to as the output power of the array antenna 12.

The front-end module 14 may be connected to the array antenna 12. The front-end module 14 may generate a signal, which is output through the array antenna 12, in a transmission mode and may process a signal, which is received through the array antenna 12, in a reception mode. As described below with reference to FIG. 2, the front-end module 14 may include a power detector and may detect the power of a signal that is output through the front-end module 14. As described below, e.g., with reference to FIGS. 3A, 3B and 4, output power of the front-end module 14 may be different from the output power of the array antenna 12, and thus, it may be desirable to estimate the output power of the array antenna 12 relative to the output power of the front-end module 14. For instance, there may be significant mismatch losses between the front-end module 14 and the array antenna 12. As described below, a correction coefficient for estimating the output power of the array antenna 12 may be accurately calculated. Therefore, the output power of the array antenna 12 may be accurately estimated, allowing the transmission power to be accurately controlled. By accurately controlling transmission power, the power consumption and heat emission of the user equipment 10 may be reduced.

The back-end module 16 may process a signal provided by the signal processing circuit 18 and provide the signal to the front-end module 14, in the transmission mode. For example, the back-end module 16 may generate a radio frequency (RF) band signal up-converted from a baseband signal according to a local oscillating signal, in the transmission mode. In addition, the back-end module 16 may process a signal provided by the front-end module 14 and provide the signal to the signal processing circuit 18, in the reception mode. For example, the back-end module 16 may generate a baseband signal down-converted from an RF band signal according to a local oscillating signal, in the reception mode. In some embodiments, the back-end module 16 may include a phased locked loop (PLL) generating the local oscillating signal.

The signal processing circuit 18 may generate a baseband signal, which includes information intended to be transferred to the base station 1, and provide the baseband signal to the back-end module 16, in the transmission mode. In addition, the signal processing circuit 18 may extract information from a baseband signal received from the back-end module 16, in the reception mode. In some embodiments, the signal processing circuit 18 may include a programmable component, such as a central processing unit (CPU) or a digital signal processor (DSP), a reconfigurable component, such as a field programmable gate array (FPGA), and/or a component providing a fixed function, such as an intellectual property (IP) core.

Figure 2:
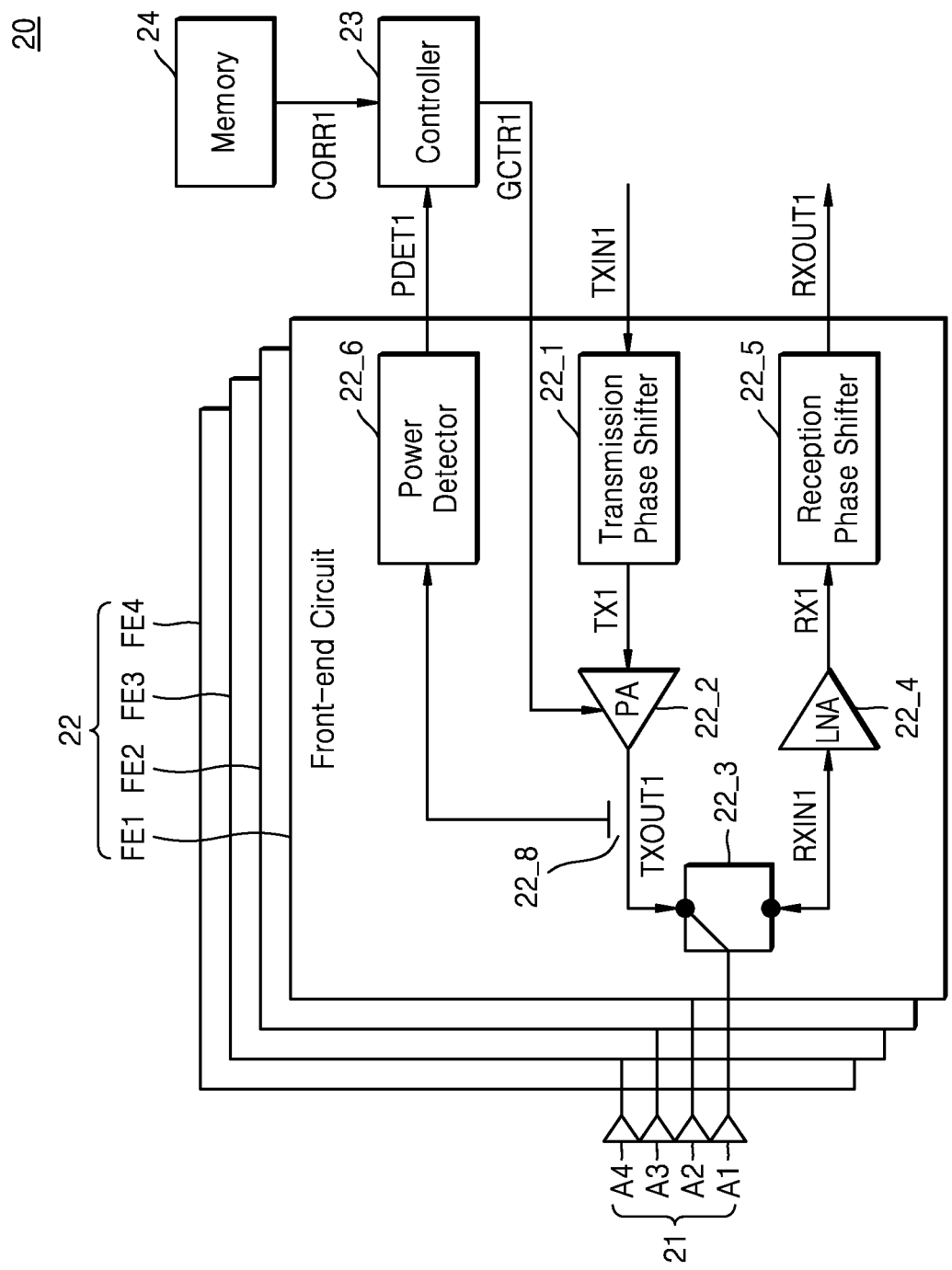
FIG. 2 is a block diagram illustrating a user equipment according to an example embodiment.

FIG. 2 is a block diagram illustrating a user equipment 20 according to an example embodiment. As shown in FIG. 2, the user equipment 20 may include an array antenna 21, a front-end module 22, a controller 23, and a memory 24. In some embodiments, the controller 23 and the memory 24 in FIG. 2 may be included in the signal processing circuit 18 of FIG. 1. The memory 24 may store correction coefficients used for an accurate output power measurement as described below. In addition, the memory 24 (a non-transitory recording medium) may store program instructions that may be read and executed by a processor within the controller 23 to carry out the controller operations as described hereafter.

The array antenna 21 may include first to fourth antennas A1 to A4. The front-end module 22 may include first to fourth front-end circuits FE1 to FE4 respectively corresponding to the first to fourth antennas A1 to A4, where the first to fourth front-end circuits FE1 to FE4 may each have the same structure. As shown in FIG. 2, the first front-end circuit FE1 may include a transmission phase shifter 22_1, a power amplifier (PA) 22_2, a transmit/receive (T/R) switch 22_3, a low noise amplifier (LNA) 22_4, a reception phase shifter 22_5, a coupler 22_8, and a power detector 22_6. Hereinafter, although an array antenna including four antennas as shown in FIG. 2 will be mainly described, it should be noted that embodiments of the inventive concept are not limited thereto.

In the transmission mode, the transmission phase shifter 22_1 may adjust the phase of a signal TXIN1 received from the back-end module 16 of FIG. 1. The power amplifier 22_2 may amplify an output signal TX1 of the transmission phase shifter 22_1. An output signal TXOUT1 of the power amplifier 22_2 may be provided to the T/R switch 22_3 and may be provided to the first antenna A1 by the T/R switch 22_3, set to the transmission mode. In the reception mode, the T/R switch 22_3 may provide a signal RXIN1, which is received through the first antenna A1, to the LNA 22_4. The LNA 22_4 may amplify the signal RXIN1 provided by the T/R switch 22_3. The reception phase shifter 22_5 may adjust the phase of an output signal RX1 of the LNA 22_4, and an output signal RXOUT1 of the reception phase shifter 22_5 may be provided to the back-end module 16 of FIG. 1. It is noted here that in other embodiments, the antennas A1-A4 are used exclusively on transmit and are not shared for receiving operations. In this case, the T/R switch 22_3 may be omitted and the receive path components may be connected directly to other (receive only) antenna elements.

The power detector 22_6 may detect output power of the first power amplifier 22_2 by detecting a small portion of the output power coupled through the coupler 22_8. For example, the power detector 22_6 may sample the output signal TXOUT1 of the power amplifier 22_2, and may generate a first detection signal PDET1 by detecting the output power of the power amplifier 22_2. The value of the first detection signal PDET1 may represent the magnitude of the output power of the power amplifier 22_2 and may be referred to herein as an output value of the power detector 22_6.

The controller 23 may receive the first detection signal PDET1 from the power detector 22_6 and may provide a first gain control signal GCTR1 to the power amplifier 22_2. In addition, the controller 23 may receive a first correction coefficient CORR1 from the memory 24. The controller 23 may estimate output power of the first antenna A1, based on the value of the first detection signal PDET1 and the first correction coefficient CORR1. The controller 23 may adjust the gain of the power amplifier 22_2 through the first gain control signal GCTR1, based on the estimated output power of the first antenna A1. As a result, the output power of the first antenna A1 may be adjusted. Although not shown for clarity of illustration, the controller 23 may respectively receive second to fourth detection signals PDET2, PDET3 and PDET4 from the second to fourth front-end circuits FE2 to FE4 and may respectively provide second to fourth gain control signals to the second to fourth front-end circuits FE2 to FE4 in a similar manner. Each gain control signal may be based on a respective one of PDET2, PDET3 or PDET4 and a respective correction coefficient CORR2, CORR3 or CORR4 (not shown).

The memory 24 may store the first correction coefficient CORR1 and may provide the first correction coefficient CORR1 to the controller 23. As described above, the output power of the first antenna A1 may be calculated based on the first correction coefficient CORR1, and thus, the accuracy of the output power of the first antenna A1 may depend on the first correction coefficient CORR1. The memory 24 may store second to fourth correction coefficients CORR2, CORR3 and CORR4 respectively corresponding to the second to fourth antennas A2 to A4. Examples of correction coefficients stored in the memory 24 will be described below with reference to FIGS. 9 and 11. The memory 24 may have any suitable structure for storing correction coefficients. For example, the memory 24 may include volatile memory, such as dynamic random access memory (DRAM) or static random access memory (SRAM), or non-volatile memory, such as flash memory.

Figure 3A:
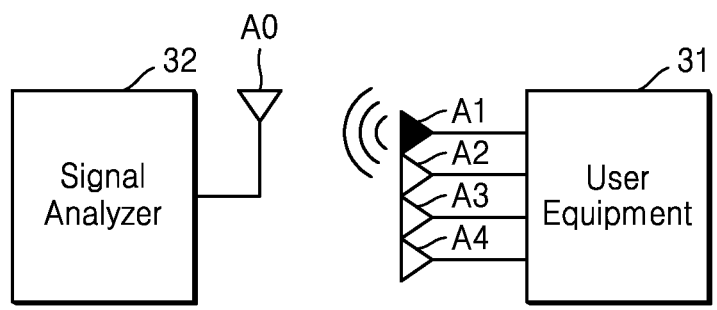
FIGS. 3A and 3B are diagrams each illustrating a method of obtaining a correction value for estimating output power of an array antenna, according to an example embodiment.
Figure 3B:
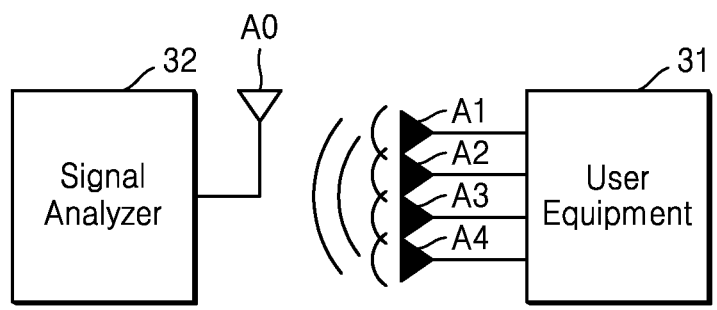

FIGS. 3A and 3B are diagrams each illustrating a method of obtaining a correction value for estimating output power of an array antenna, according to an example embodiment. The method of FIG. 3A and the method of FIG. 3B may be sequentially performed in the process of manufacturing a user equipment 31 in a calibration mode.

Referring to FIG. 3A, the user equipment 31 may include the first to fourth antennas A1 to A4. A signal analyzer 32 may receive a signal, which is transmitted by the user equipment 31, through an antenna A0 and may measure transmission power of the user equipment 31. Herein, the magnitude of the transmission power measured by the signal analyzer 32 may be referred to as a measurement value. As shown in FIG. 3A, the user equipment 31 may drive only the first antenna A1 from among the first to fourth antennas A1 to A4. For example, in the user equipment 31, only one power amplifier (e.g., 22_2 of front end circuit FE1 in FIG. 2) from among first to fourth power amplifiers, which respectively correspond to the first to fourth antennas A1 to A4, may be enabled, and the remaining power amplifiers may be disabled (e.g., their bias voltages are turned off).

The signal analyzer 32 may measure the output power of the first antenna A1 by measuring the power of the receive signal and then multiplying it by a multiplier to obtain a measurement value. The measurement value may be in terms of EIRP, in which case the multiplier may be based on both the RF input power to the transmitting antenna, and the free space loss, where the free space loss is positively correlated to the distance between the user equipment 31 and the signal analyzer 32. In the user equipment 31, the power detector (e.g., 22_6 in FIG. 2) associated with the first antenna A1 may generate the output value PDET1 by detecting the power of a signal provided to the first antenna A1, that is, output power of the first power amplifier. A correction value may be calculated as a difference between the measurement value of the signal analyzer 32 and an output value of the power detector. The correction value may be calculated by the user equipment 31, as described below with reference to FIG. 7A, or may be calculated by the signal analyzer 32, as described below with reference to FIG. 7B. In a similar manner to that described above, correction values respectively for the second to fourth antennas A2 to A4 may be calculated. Accordingly, the correction values respectively corresponding to the first to fourth antennas A1 to A4, that is, antenna correction values, may be obtained.

Referring to FIG. 3B, the user equipment 31 may drive all the first to fourth antennas A1 to A4. For example, in the user equipment 31, all the first to fourth power amplifiers respectively corresponding to the first to fourth antennas A1 to A4 may be enabled, and the first to fourth power amplifiers may respectively drive the first to fourth antennas A1 to A4.

The signal analyzer 32 may measure the collective output power of the first to fourth antennas A1 to A4 by measuring the power of the receive signal and optionally performing the same adjustment based on estimated free space loss as above. In the user equipment 31, the first to fourth power detectors respectively corresponding to the first to fourth antennas A1 to A4 may generate four output values by detecting powers of signals provided to the first to fourth antennas A1 to A4, that is, output powers of the first to fourth power amplifiers, respectively. The user equipment 31 may then respectively estimate the output power of each of the first to fourth antennas A1 to A4 from the four output values generated in FIG. 3B, based on the correction values calculated in FIG. 3A, that is, the four antenna correction values respectively corresponding to the first to fourth antennas A1 to A4. To this end, a correction value of the array antenna including the first to fourth antennas A1 to A4 may be calculated as a difference between the measurement value of the signal analyzer 32 and a sum of the estimated output powers. The correction value of the array antenna may be calculated by the user equipment 31, as described below with reference to FIG. 7A, or may be calculated by the signal analyzer 32, as described below with reference to FIG. 7B.

The correction values (i.e., the antenna correction values) obtained in FIG. 3A and the correction value (i.e., the correction value of the array antenna) obtained in FIG. 3B may be used for the user equipment 31 to estimate the output power of the array antenna including the first to fourth antennas A1 to A4 from the output values of the first to fourth power detectors, in a normal mode, for example, a mode of communicating with a base station (e.g., 1 in FIG. 1). As described below with reference to FIG. 4, the correction values obtained by the methods of FIGS. 3A and 3B and the output power of the array antenna, which is estimated by using the correction values, may each include an error.

Figure 4:
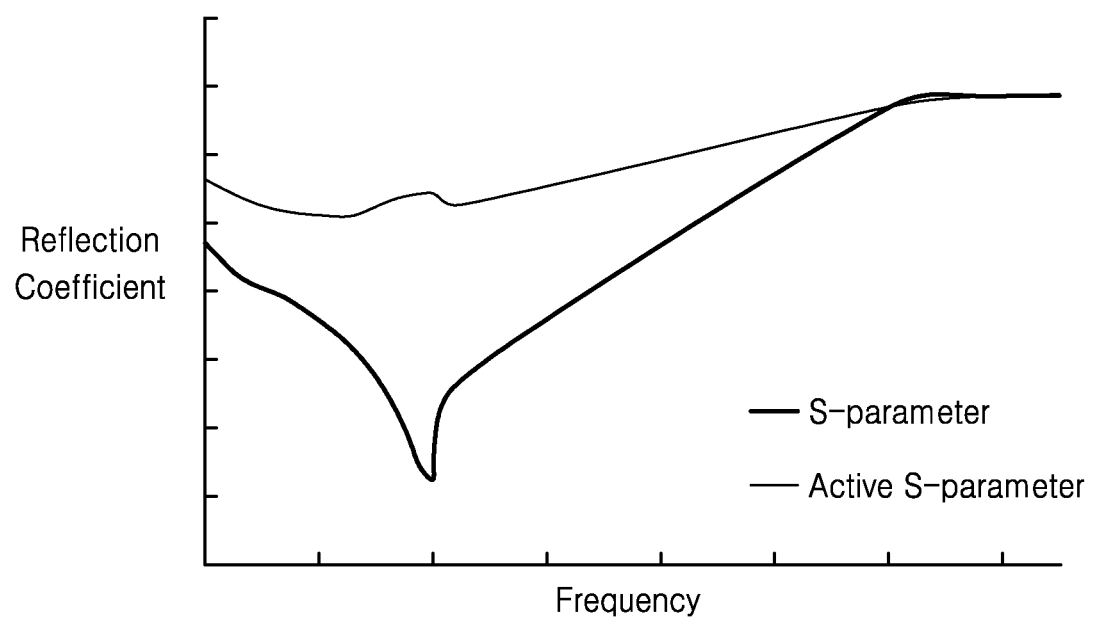
FIG. 4 is a graph depicting an example reflection coefficient of an antenna element in a single antenna element environment vs. an active array antenna environment

FIG. 4 is a graph depicting an example reflection coefficient of an antenna element, and illustrates how the reflection coefficient may differ in an active array antenna environment vs. a single antenna element environment. In the graph of FIG. 4, the horizontal axis represents frequencies, and the vertical axis represents reflection coefficients. Hereinafter, descriptions regarding FIG. 4 will be made with reference to FIGS. 3A and 3B.

In the normal mode, for example, a mode of communicating with a base station (e.g., 1 of FIG. 1), all the first to fourth antennas A1 to A4 included in the array antenna may be driven. Accordingly, the power measured by the signal analyzer 32 while only one antenna is driven, as described above with reference to FIG. 3A, may be different from a normalized power (normalized to a single antenna, e.g., one quarter of the array antenna power) measured in the actual normal mode. For example, in FIG. 3A, the first antenna A1 may not be influenced by the second to fourth antennas A2 to A4, for example, mismatch (due to the transmissions of the other antennas), coupling to/from the other antennas ("mutual coupling"), and the like. Therefore, the state of driving only the first antenna A1 in FIG. 3A may correspond to the S-parameter "S11" (reflection coefficient "looking into" the first antenna A1) in the graph of FIG. 4 (where the lowest loss due to S11 occurs at the lowest point in the graph). On the other hand, as described above with reference to FIG. 3B, a reflection coefficient measured on the first antenna A1 while all the first to fourth antennas A1 to A4 are driven may correspond to the Active S-parameter in FIG. 4. In the example of FIG. 4, higher loss due to S11 occurs at most frequencies for the Active S-parameter case.

As shown in FIG. 4, the S-parameter and the Active S-parameter may be significantly different from each other over a wide range of frequencies. The load impedance of a power amplifier may depend on a reflection coefficient of an antenna, and thus, when a correction value obtained by driving only one antenna is applied to a state in which an array antenna is driven in the normal mode, an error may be generated.

Figure 5A:
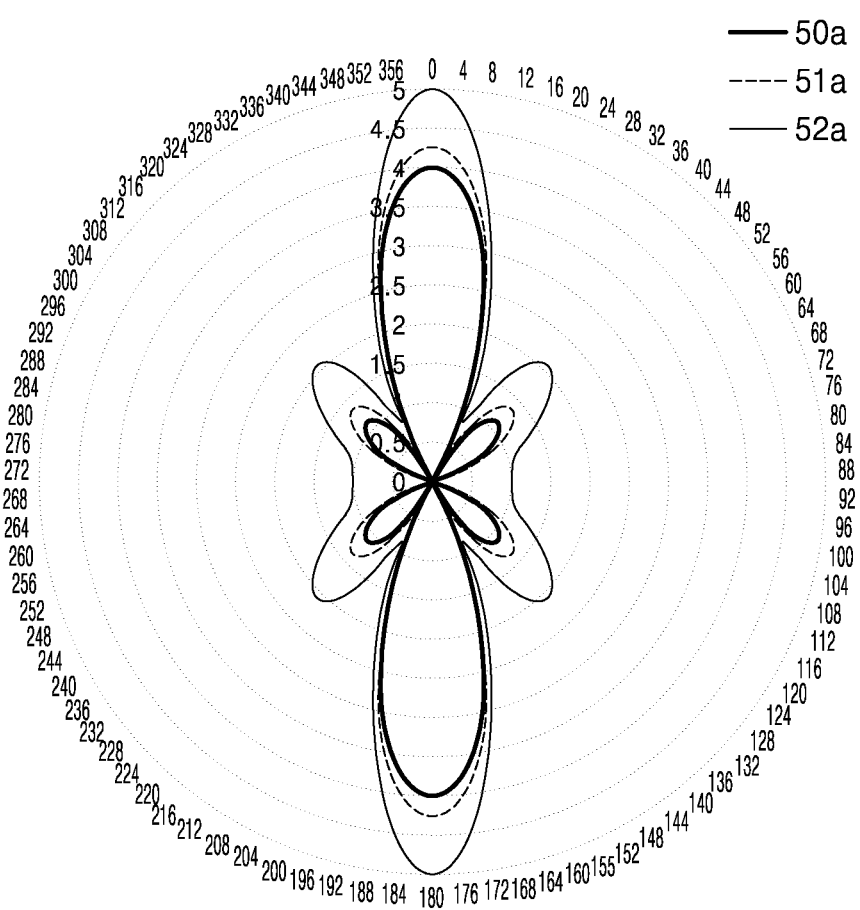
FIGS. 5A and 5B are diagrams each illustrating radiation patterns of an array antenna, according to example embodiments.
Figure 5B:
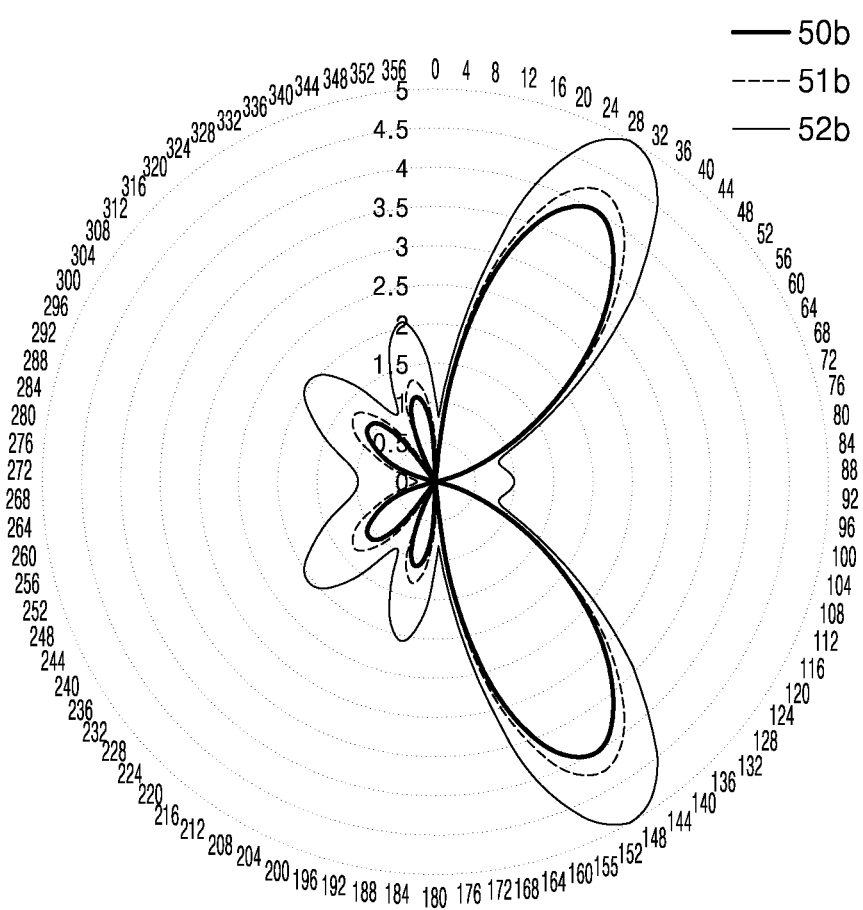

FIGS. 5A and 5B are diagrams each illustrating radiation patterns of an array antenna, according to example embodiments. Specifically, the array antenna radiation diagram of FIG. 5A represents a beam formed in a boresight direction, and the array antenna radiation diagram of FIG. 5B represents a beam formed in a 30-degree direction off boresight. Hereinafter, descriptions regarding FIGS. 5A and 5B will be made with reference to FIG. 2.

While a beam is formed by the array antenna 21, when the gain of a power amplifier driving one antenna is slightly changed, the beam may approximately maintain a pointing angle thereof but may exhibit a change in EIRP. Accordingly, in the calibration mode, a correction coefficient may be calculated based on a change in the EIRP corresponding to a change in the gain of the power amplifier, and in the normal mode, the correction coefficient may be used to accurately estimate the EIRP.

Referring to FIG. 5A, a reference curve 50a represents main lobes formed in the boresight direction, and sidelobes. A first curve 51a represents a beam formed when the gain of the first power amplifier 22_2 driving the first antenna A1 is increased by one step size from the gain corresponding to the reference curve 50a. As shown in FIG. 5A, the first curve 51a may have a boresight direction like the reference curve 50a and have higher EIRP than the reference curve 50a. A second curve 52a represents a beam formed when the gain of the first power amplifier 22_2 driving the first antenna A1 is increased by three step sizes from the gain corresponding to the reference curve 50a. As shown in FIG. 5A, the second curve 52a may have a boresight direction like the reference curve 50a and the first curve 51a and have higher EIRP than the reference curve 50a and the first curve 51a.

Referring to FIG. 5B, a reference curve 50b represents main lobes formed in a 30-degree direction off boresight, and sidelobes. A first curve 51b represents a beam formed when the gain of the first power amplifier 22_2 driving the first antenna A1 is increased by one step size from the gain corresponding to the reference curve 50b. As shown in FIG. 5B, the first curve 51b may have a 30-degree direction like the reference curve 50b and have higher EIRP than the reference curve 50b. A second curve 52b represents a beam formed when the gain of the first power amplifier 22_2 driving the first antenna A1 is increased by three step sizes from the gain corresponding to the reference curve 50b. As shown in FIG. 5B, the second curve 52b may have a 30-degree direction like the reference curve 50b and the first curve 51b and have higher EIRP than the reference curve 50b and the first curve 51b.

Figure 6:
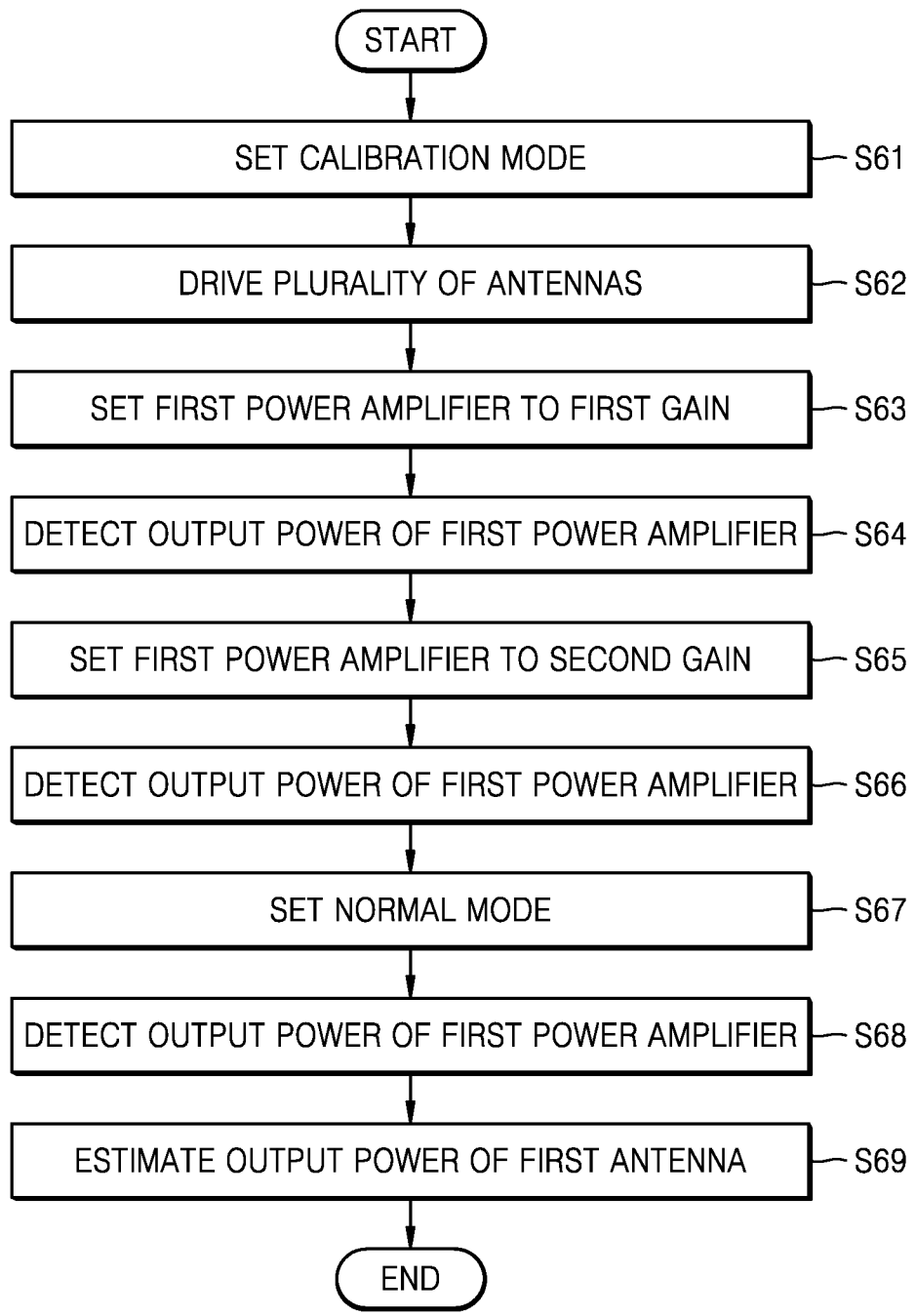
FIG. 6 is a flowchart illustrating a method of estimating output power of an array antenna, according to an example embodiment.

FIG. 6 is a flowchart illustrating a method of estimating output power of an array antenna, according to an example embodiment. As shown in FIG. 6, the method of estimating output power of an array antenna may include a plurality of operations S61 to S69. Herein, the method of estimating output power of an array antenna may be referred to as a wireless communication method through an array antenna. In some embodiments, the method of FIG. 6 may be performed by the user equipment 20 of FIG. 2. Hereinafter, descriptions regarding FIG. 6 are given with reference to FIG. 2.

As described with reference to FIGS. 5A and 5B, when the gain of a power amplifier driving one of the antennas included in an array antenna is slightly changed, a direction of a beam formed by the array antenna may be maintained, but the EIRP thereof may change. Accordingly, as described below with reference to FIG. 6, a correction coefficient may be calculated based on output values and measurement values, both corresponding to two or more different gains. With this technique, the correction coefficient may be highly accurate.

Referring to FIG. 6, in operation S61, a calibration mode may be set. For example, as described above with reference to FIGS. 3A and 3B, during the process of manufacturing the user equipment 20, a signal analyzer may be used to measure the output power of the array antenna 21. The user equipment 20 may be set to the calibration mode and may transmit an appropriate signal through the array antenna 21 according to conditions described below.

In operation S62, a plurality of antennas may be driven. For example, the controller 23 may control the front-end module 22 such that all the first to fourth antennas A1 to A4 of the array antenna 21 are driven. Accordingly, power amplifiers respectively included in the first to fourth front-end circuits FE1 to FE4 may respectively drive the first to fourth antennas A1 to A4.

In operation S63, a first power amplifier may be set to a first gain. For example, the controller 23 may generate the first gain control signal GCTR1 to set, to the first gain, the gain of the first power amplifier 22_2, which drives the first antenna A1 from among the first to fourth antennas A1 to A4 of the array antenna 21. The first gain may be different from a second gain described below. The second to fourth antennas A2 to A4 may also be driven by their respective power amplifiers which may be biased to have the same respective gains as they have in the normal mode ("normal mode gains"). These gains may be different from the first gain. In other words, the first gain of the first power amplifier may be a gain that is changed from its normal mode gain. It is noted that in some embodiments, all the antennas A1 to A4 are driven with the same power in the normal mode (which may be realized by setting the same gain for each of the power amplifiers). In other embodiments, different powers are applied to different ones of the antennas A1 to A4 in the normal mode.

In operation S64, output power of the first power amplifier may be detected. For example, the first power detector 22_6 may sample the output signal TXOUT1 of the first power amplifier 22_2 and may generate the first detection signal PDET1 by detecting the output power of the first power amplifier 22_2. The controller 23 may identify the magnitude of the output power of the first power amplifier 22_2, based on a value of the first detection signal PDET1 corresponding to the first gain (a "first output value" of the first power amplifier 22_2). In addition, a signal analyzer (e.g., 32 of FIGS. 3A and 3B) a certain distance away from the user equipment 20 may measure the output power of the array antenna 21, which includes the first antenna A1 driven by the first power amplifier 22_2 that is set to the first gain, and may generate a first measurement value. The first measurement value, e.g., defined in terms of EIRP, may be obtained by the signal analyzer measuring received signal power and multiplying the same by a multiplier. The multiplier may be based on free space loss and RF input power at the transmitting antenna, where the RF input power is associated with the first gain.

In operation S65, the first power amplifier may be set to the second gain. For example, the controller 23 may generate the first gain control signal GCTR1 to set, to the second gain, the gain of the first power amplifier 22_2, which drives the first antenna A1 from among the first to fourth antennas A1 to A4 of the array antenna 21. The second gain may be different from the first gain described above and may be different from the normal mode gain of the first power amplifier. The remaining power amplifiers driving the second to fourth antennas A2 to A4 may be biased to have the same gain as in operation S63. In some embodiments, a difference between the first gain and the second gain may correspond to a minimum step size of the gain of the first power amplifier 22_2. In some embodiments, the difference between the first gain and the second gain may have a magnitude resulting in no change, or only a slight change, in the radiation pattern of the array antenna (e.g., the main lobe still points in the same direction within a tolerance range). In operation S66, the output power of the first power amplifier may again be detected, in the same manner as described above for operation S64, to obtain a second output value of the first power amplifier 22_2. Correspondingly, the signal analyzer may generate a second measurement value in the same manner as described above.

A correction coefficient of the first antenna A1 may be calculated based on the first output value and the first measurement value, which correspond to the first gain, and the second output value and the second measurement value, which correspond to the second gain. The correction coefficient of the first antenna A1 may be calculated based on a difference between the first output value and the second output value and a difference between the first measurement value and the second measurement value. For example, a correction coefficient $C_1$ of the first antenna A1 may be calculated based on Equation 1:

$$C_1 = \frac{EIRP_1 - EIRP_2}{OUT_1 - OUT_2} \qquad \text{[Equation 1]}$$

In Equation 1, $EIRP_1$ and $EIRP_2$ are respectively the first measurement value and the second measurement value, and $OUT_1$ and $OUT_2$ are respectively the first output value and the second output value. The correction coefficient may be calculated by the user equipment 20, as described below with reference to FIG. 7A, or may be calculated by the signal analyzer receiving a signal from the user equipment 20, as described below with reference to FIG. 7B. The calculated correction coefficient may be stored in the memory 24. It is noted here that $EIRP_1$ may be referenced to an isotropic radiator driven by a first RF input power associated with the first gain, and $EIRP_2$ may be referenced to an isotropic radiator driven by a second RF input power associated with the second gain. Thus, the first and second measurement values may be obtained by multiplying the actual respective receive powers at the signal analyzer by different respective multipliers, which reflect the same free space loss but different RF input power, with reference to a hypothetical lossless, effective isotropic radiator in the two cases.

In operation S67, a normal mode may be set. For example, the process of manufacturing the user equipment 20 may be completed, and the user equipment 20 may be set to the normal mode. The user equipment 20 may communicate with another wireless communication device, for example, the base station 1 of FIG. 1, through the array antenna 21, in the normal mode.

In operation S68, the output power of the first power amplifier 22_2 may be detected, based on the value of the first detection signal PDET1 obtained in the same manner as in the calibration mode.

In operation S69, the output power of the first antenna A1 may be estimated. For example, the controller 23 may estimate the output power of the first antenna A1, based on the correction coefficient calculated in the calibration mode and the output value obtained in operation S68. For example, the output power, when defined in terms of EIRP, of the first antenna A1 may be calculated based on Equation 2.

$$EIRP = C_1 * OUT \qquad \text{[Equation 2]}$$

In Equation 2, $C_1$ may be the correction coefficient of Equation 1, and OUT may be the output value obtained in operation S68. As described below with reference to FIG. 12, the controller 23 may estimate the respective output powers of the first to fourth antennas A1 to A4 and may control the respective gains of the first to fourth power amplifiers, based on the estimated output powers.

Figure 7A:
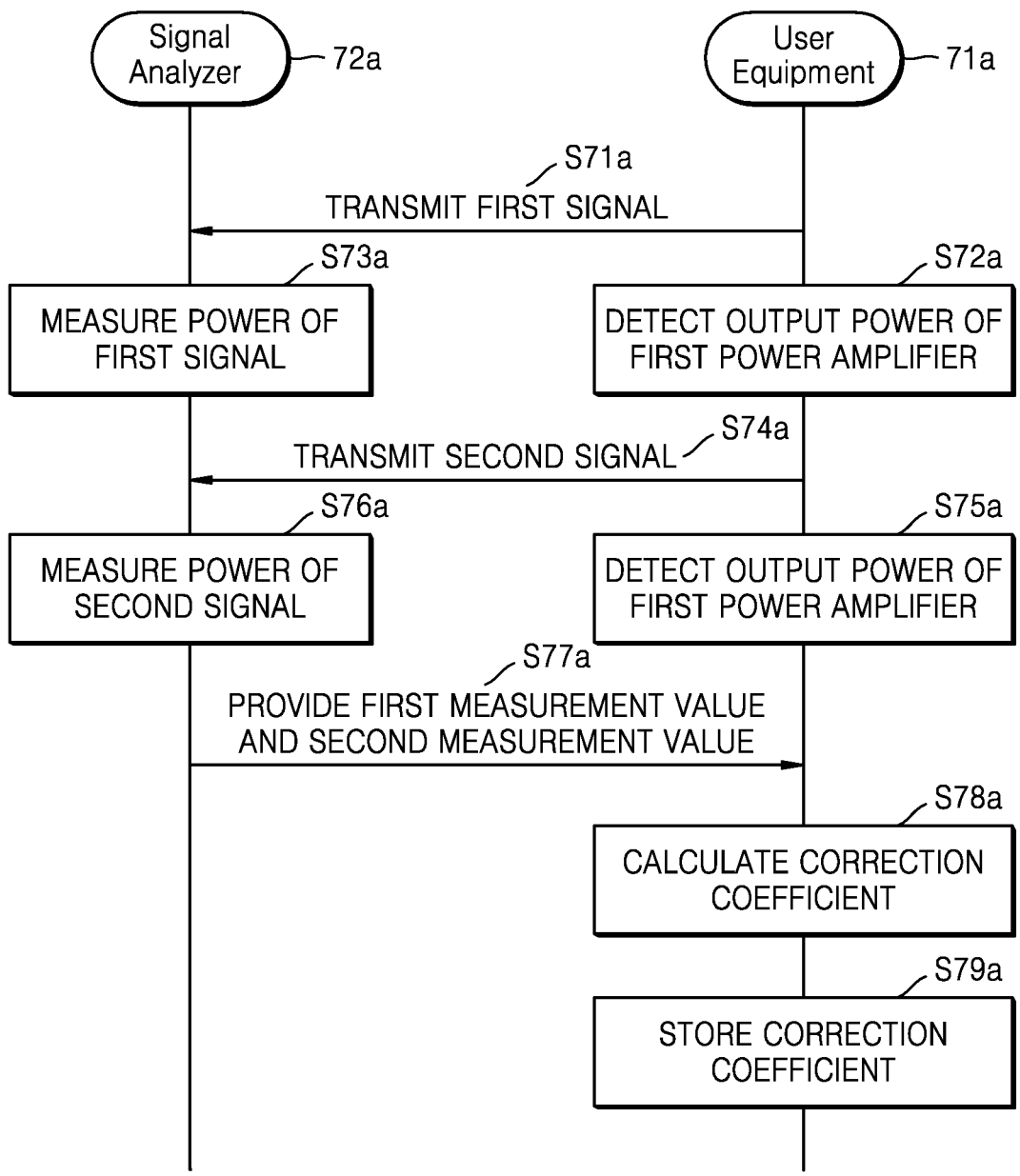
FIGS. 7A and 7B are message diagrams respectively illustrating examples of a method of estimating output power of an array antenna, according to example embodiments.
Figure 7B:
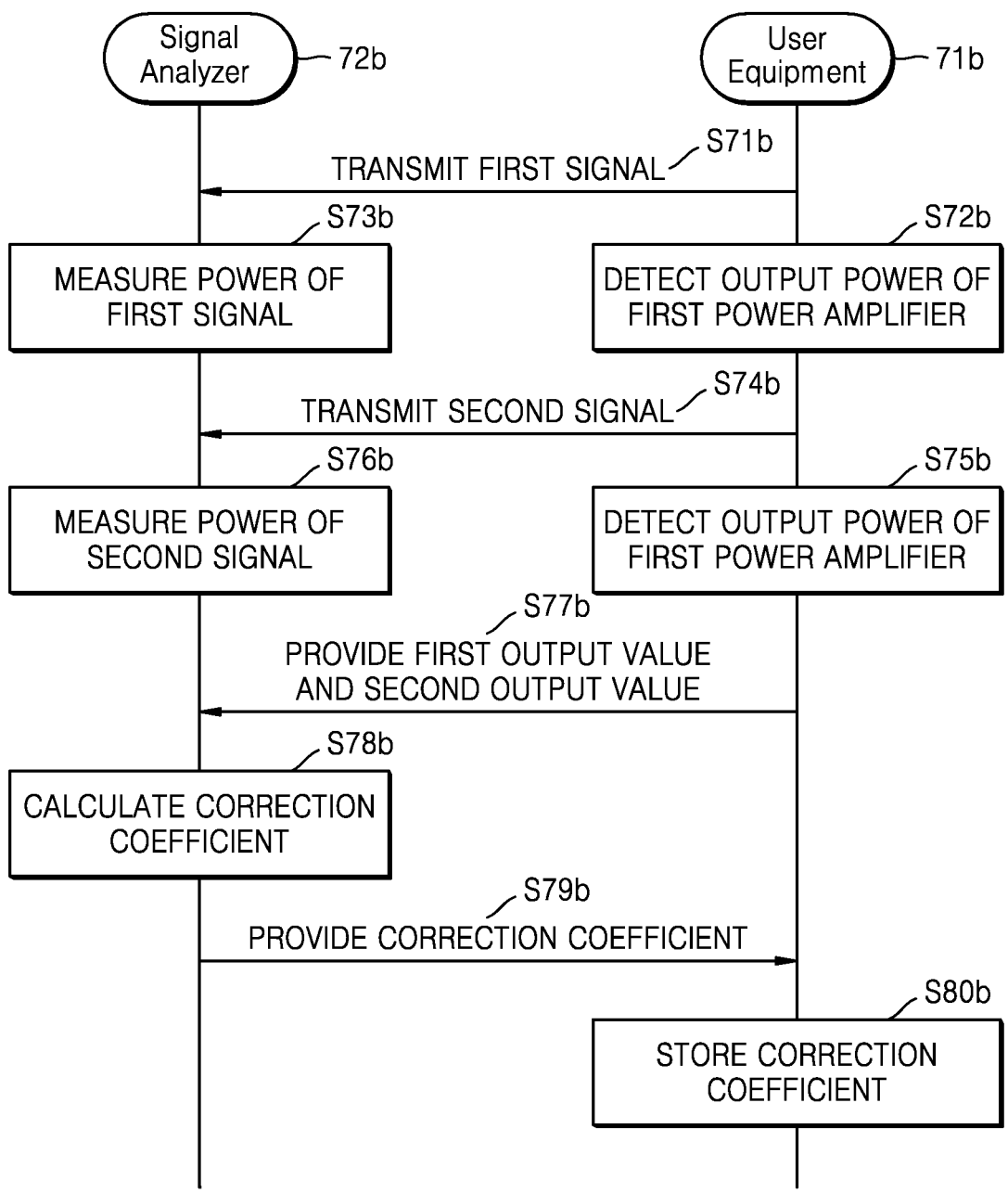

FIGS. 7A and 7B are message diagrams respectively illustrating examples of a method of estimating output power of an array antenna, according to example embodiments. Specifically, the message diagrams of FIGS. 7A and 7B respectively illustrate operations of signal analyzers 72a and 72b and user equipments 71a and 71b set to the calibration mode, over time.

Referring to FIG. 7A, in operation S71a, the user equipment 71a may transmit a first signal to the signal analyzer 72a. For example, the user equipment 71a may transmit the first signal to the signal analyzer 72a through an array antenna, and the signal analyzer 72a may receive the first signal through an antenna. During the transmission of the first signal, the user equipment 71a may set, to a first gain, a first power amplifier, which drives a first antenna from among antennas included in the array antenna.

In operation S72a, the user equipment 71a may detect output power of the first power amplifier. For example, a first power detector included in the user equipment 71a may detect the output power of the first power amplifier and may generate a first output value. In operation S73a, the signal analyzer 72a may measure the power of the first signal. For example, the signal analyzer 72a may measure the power of the first signal, which is received from the user equipment 71a in operation S71a, and may generate a first measurement value in the manner described above.

In operation S74a, the user equipment 71a may transmit a second signal to the signal analyzer 72a. For example, the user equipment 71a may transmit the second signal to the signal analyzer 72a through the array antenna, and the signal analyzer 72a may receive the second signal through the antenna. During the transmission of the second signal, the user equipment 71a may set, to a second gain, the first power amplifier, which drives the first antenna from among the antennas included in the array antenna.

In operation S75a, the user equipment 71a may detect the output power of the first power amplifier. For example, the first power detector included in the user equipment 71a may detect the output power of the first power amplifier and may generate a second output value. In operation S76a, the signal analyzer 72a may measure the power of the second signal. For example, the signal analyzer 72a may measure the power of the second signal, which is received from the user equipment 71a in operation S74a, and may generate a second measurement value as described earlier.

In operation S77a, the signal analyzer 72a may provide the first measurement value and the second measurement value to the user equipment 71a. In some embodiments, the signal analyzer 72a may transmit a signal including the first measurement value and the second measurement value to the user equipment 71a through the antenna, and the user equipment 71a may receive the signal including the first measurement value and the second measurement value through the array antenna. In some embodiments, the signal analyzer 72a and the user equipment 71a may have a communication channel (e.g., a wired or wireless communication channel) that is different from a wireless communication channel through the array antenna of the user equipment 71a, and the signal analyzer 72a may provide the first measurement value and the second measurement value to the user equipment 71a through the corresponding communication channel.

In operation S78a, the user equipment 71a may calculate a correction coefficient. For example, the user equipment 71a or a controller in the user equipment 71a may calculate the correction coefficient, based on the first output value and the second output value, which are respectively obtained in operations S72a and S75a, and the first measurement value and the second measurement value, which are provided by the signal analyzer 72a in operation S77a. In some embodiments, the user equipment 71a may calculate the correction coefficient, based on Equation 1.

In operation S79a, the user equipment 71a may store the correction coefficient. For example, the controller of the user equipment 71a may store, in a memory, the correction coefficient calculated in operation S78a. The correction coefficient stored in the memory may be used for the user equipment 71a to estimate the output power of the array antenna, in the normal mode.

The operations of FIG. 7A may be repeated for each of the remaining antennas A2-A4 of the antenna array, resulting in a respective correction coefficient being calculated and stored in association with each of the antennas A1-A4.

Referring to FIG. 7B, operations S71b, S72b, S73b, S74b, S75b and S76b may be the same as operations S71a-S76a of FIG. 7A described above, but using user equipment 71b and signal analyzer 72b.

In operation S77b, the user equipment 71b may provide the first output value and the second output value to the signal analyzer 72b. The user equipment 71b may transmit a signal including the first output value and the second output value to the signal analyzer 72b through the array antenna, and the signal analyzer 72b may receive the signal including the first output value and the second output value through the antenna. Note that the signal analyzer 72b and the user equipment 71b may have a communication channel (e.g., a wired or wireless communication channel) that is different from a wireless communication channel through the array antenna of the user equipment 71b, and the signal analyzer 72b may receive the first output value and the second output value from the user equipment 71b through the corresponding communication channel.

In operation S78b, the signal analyzer 72b may calculate a correction coefficient. For example, the signal analyzer 72b may calculate the correction coefficient, based on the first measurement value and the second measurement value, which are respectively obtained in operations S73b and S75b, and the first output value and the second output value, which are provided by the user equipment 71b in operation 77b. The signal analyzer 72b may calculate the correction coefficient, based on Equation 1.

In operation S79b, the signal analyzer 72b may provide the correction coefficient to the user equipment 71b. For example, the signal analyzer 72b may provide the correction coefficient calculated in operation S78b to the user equipment 71b, through the communication channel through which the first output value and the second output value are received from the user equipment 71b in operation S77b.

In operation S80b, the user equipment 71b may store the correction coefficient. For example, the controller of the user equipment 71b may store, in a memory, the correction coefficient provided by the signal analyzer 72b in operation S79b. The correction coefficient stored in the memory may be used for the user equipment 71b to estimate the output power of the array antenna, in the normal mode.

The operations of FIG. 7B may be repeated for each of the remaining antennas A2-A4 of the antenna array, resulting in a respective correction coefficient being calculated and stored in association with each of the antennas A1-A4.

Figure 8:
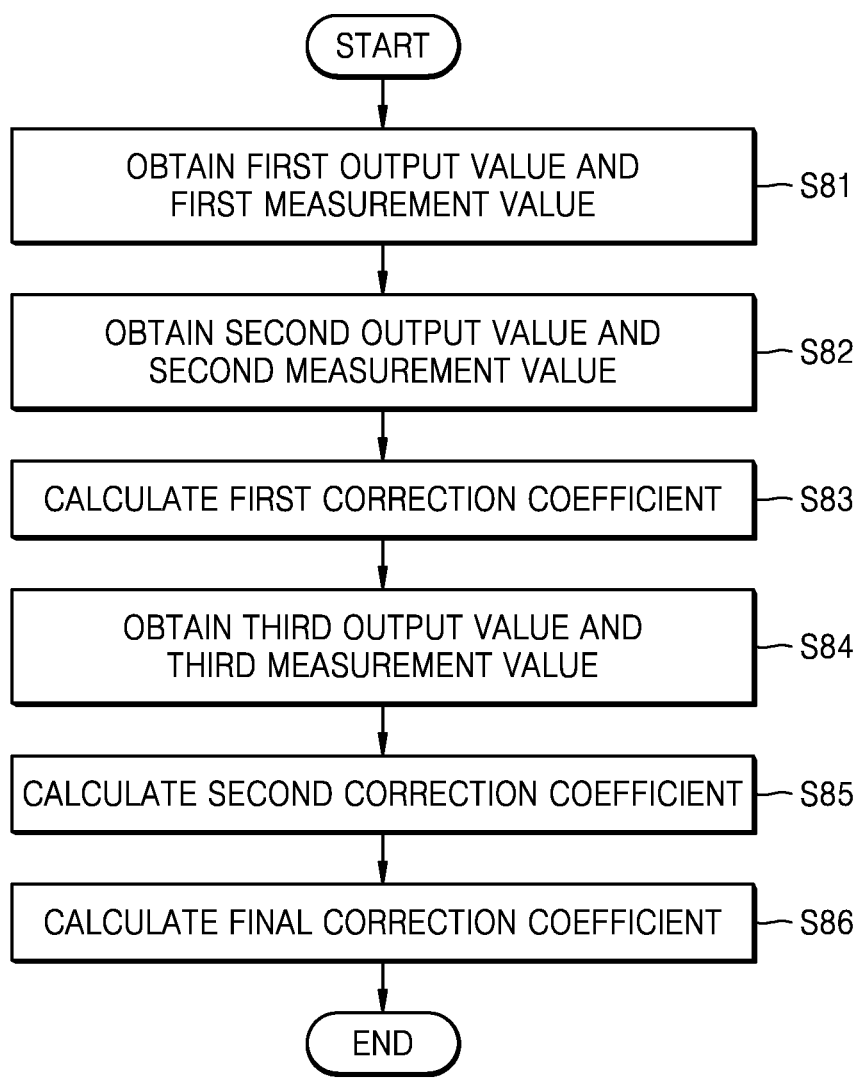
FIG. 8 is a flowchart illustrating a method of estimating output power of an array antenna, according to an example embodiment.

FIG. 8 is a flowchart illustrating a method of estimating output power of an array antenna, according to an example embodiment. As shown in FIG. 8, the method of estimating output power of an array antenna may include a plurality of operations S81 to S86. As described above with reference to FIGS. 7A and 7B, the method of FIG. 8 may be performed by a user equipment or a signal analyzer. Hereinafter, although it is assumed that the method of FIG. 8 is performed by the user equipment 20, it should be noted that embodiments of the inventive concept are not limited thereto. Hereinafter, descriptions regarding FIG. 8 will be made with reference to FIG. 2.

Referring to FIG. 8, in operation S81, a first output value and a first measurement value may be obtained. For example, the first output value may be generated by detecting, by the first power detector 22_6, the output power of the first power amplifier 22_2, while the first power amplifier 22_2 is set to a first gain. In addition, the first measurement value may be generated by measuring, by a signal analyzer, the output power of the array antenna 21, while the first power amplifier 22_2 is set to the first gain.

In operation S82, a second output value and a second measurement value may be obtained. For example, the second output value may be generated by detecting, by the first power detector 22_6, the output power of the first power amplifier 22_2, while the first power amplifier 22_2 is set to a second gain that is different from the first gain. In addition, the second measurement value may be generated by measuring, by the signal analyzer, the output power of the array antenna 21, while the first power amplifier 22_2 is set to the second gain.

In operation S83, a first correction coefficient may be calculated. For example, the controller 23 may calculate the first correction coefficient, based on the first output value and the first measurement value, which are obtained in operation S81, and the second output value and the second measurement value, which are obtained in operation S82. In some embodiments, the controller 23 may calculate the first correction coefficient, based on Equation 1.

In operation S84, a third output value and a third measurement value may be obtained. For example, the third output value may be generated by detecting, by the first power detector 22_6, the output power of the first power amplifier 22_2, while the first power amplifier 22_2 is set to a third gain that is different from the first gain and the second gain. In addition, the third measurement value may be generated by measuring, by the signal analyzer, the output power of the array antenna 21, while the first power amplifier 22_2 is set to the third gain. In some embodiments, the second gain may correspond to a gain obtained by increasing the first gain by as much as a step size, and the third gain may correspond to a gain obtained by decreasing the first gain by as much as the step size.

In operation S85, a second correction coefficient may be calculated. In some embodiments, the controller 23 may calculate the second correction coefficient, based on the first output value and the first measurement value, which are obtained in operation S81, and the third output value and the third measurement value, which are obtained in operation S84. In some embodiments, the controller 23 may calculate the second correction coefficient, based on the second output value and the second measurement value, which are obtained in operation S82, and the third output value and the third measurement value, which are obtained in operation S84. For example, the controller 23 may calculate the second correction coefficient, based on Equation 1.

In operation S86, a final correction coefficient may be calculated. For example, the controller 23 may calculate a correction coefficient of a first antenna, based on the first correction coefficient calculated in operation S83 and the second correction coefficient calculated in operation S85. In some embodiments, the controller 23 may calculate an average of the first correction coefficient and the second correction coefficient as the final correction coefficient. Although FIG. 8 illustrates an example of calculating the final correction coefficient from two correction coefficients, the final correction coefficient may also be calculated based on three or more correction coefficients, in some embodiments.

FIG. 9 is a diagram illustrating an example of a correction coefficient according to an example embodiment. In some embodiments, the memory 24 of FIG. 2 may store the correction coefficients of FIG. 9. Hereinafter, descriptions regarding FIG. 9 will be made with reference to FIG. 2.

The memory 24 may store four correction coefficients $C_1$ to $C_4$ respectively corresponding to the first to fourth antennas A1 to A4 included in the array antenna 21. As described above with reference to FIGS. 6, 7A, 7B, and 8, in the calibration mode, each of the four correction coefficients $C_1$ to $C_4$ may be calculated, and the controller 23 may store the four correction coefficients $C_1$ to $C_4$ in the memory 24. In the normal mode, the controller 23 may read the four correction coefficients $C_1$ to $C_4$ from the memory 24 and may accurately estimate the output power of the array antenna 21, based on the four correction coefficients $C_1$ to $C_4$ and the output values of the first to fourth power detectors. For example, the output power, that is, $EIRP_{est}$, of the array antenna 21 may be calculated based on Equation 3:

$$EIRP_{est} = \sum_{k=1}^{4} C_k * OUT_k \quad \text{[Equation 3]}$$

In Equation 3, $C_k$ is a correction coefficient corresponding to a k-th antenna, and $OUT_k$ is output power of a k-th power amplifier driving the k-th antenna.

Figure 10:
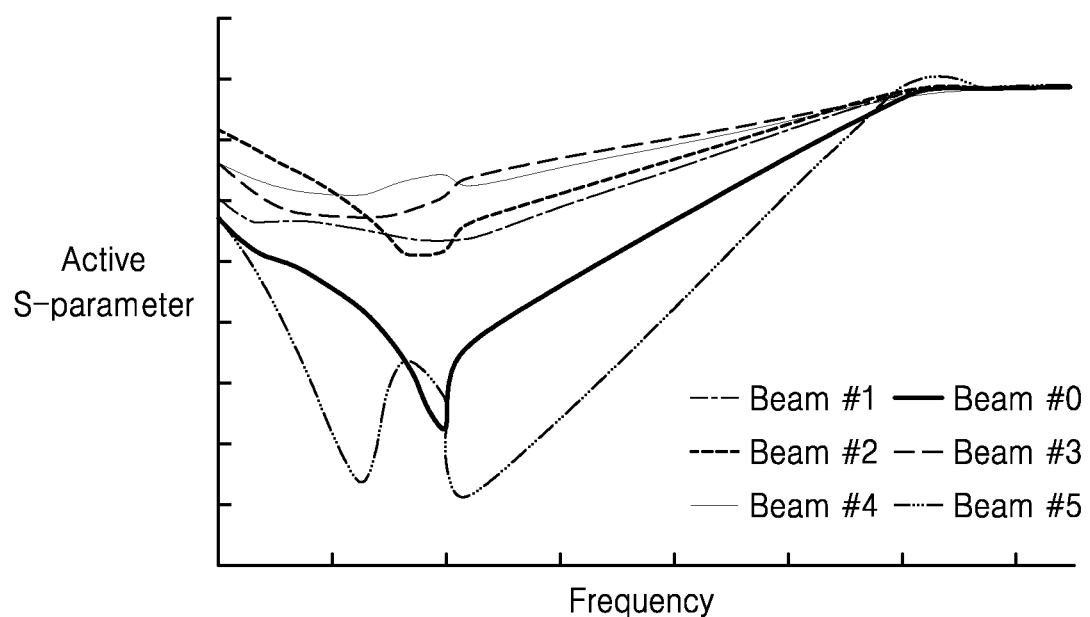
FIG. 10 is a graph depicting active modulation phenomena according to an example embodiment.

FIG. 10 is a graph depicting an example "active reflection coefficient" vs. frequency in an array antenna. In the graph of FIG. 10, the horizontal axis represents frequencies, and the vertical axis represents an Active S-parameter ("Active S11"), representing a reflection coefficient looking into one of the antenna elements while all antenna elements of the array are actively driven. Hereinafter, descriptions regarding FIG. 10 will be made with reference to FIG. 1.

In the normal mode, for example, a mode of communicating with the base station 1, phases of signals respectively provided to the antennas included in the array antenna 12 may be changed according to beam steering. Accordingly, reflection coefficients of the respective antenna elements of the array antenna 12 may be changed according to an angle of a beam, and the change in the reflection coefficients of the may cause changes in load impedances of power amplifiers. For example, the graph of FIG. 10 illustrates Active S11 of an antenna element during respective beamforming environments of six beams (for example, Beam #0 to Beam #5) respectively having different angles. As shown in FIG. 10, when beams respectively having different angles are formed, the Active S11 for an antenna element may differ from beam to beam over a wide range of frequencies. Therefore, for the accurate estimation of EIRP, the angle of the beam may be considered.

FIG. 11 is a diagram illustrating examples of correction coefficients according to an example embodiment. In some embodiments, the memory 24 of FIG. 2 may store the correction coefficients of FIG. 11. Hereinafter, descriptions regarding FIG. 11 will be made with reference to FIG. 2.

The memory 24 may store correction coefficients corresponding to each of the first to fourth antennas A1 to A4 included in the array antenna 21. For example, as shown in FIG. 11, the memory 24 may store correction coefficients $C_{11}$ to $C_{1n}$ corresponding to the first antenna A1 and may store correction coefficients $C_{41}$ to $C_{4n}$ corresponding to the fourth antenna A4 (where n is an integer greater than 1). In addition, the memory 24 may store correction coefficients according to beam steering. For example, as shown in FIG. 11, the memory 24 may store correction coefficients (e.g., $C_{11}$, $C_{41}$, and the like) corresponding to a first angle $\theta_1$ of the beam and may store correction coefficients (e.g., $C_{1n}$, $C_{4n}$, and the like) corresponding to an n-th angle $\theta_n$ of the beam.

Each of the correction coefficients of FIG. 11 may be calculated based on power detected and measured while the array antenna 21 forms the beam having an angle corresponding to each of the correction coefficients. For example, the correction coefficient $C_{11}$, which corresponds to the first antenna A1 and the first angle $\theta_1$, may be calculated based on output values and measurement values, which are obtained by changing the gain of the first power amplifier 22_2 driving the first antenna A1, while the phase shifters of the front-end module 22 are set such that the beam formed by the array antenna 21 has the first angle $\theta_1$. Similarly, the correction coefficient $C_{1n}$, which corresponds to the first antenna A1 and the n-th angle $\theta_n$, may be calculated based on output values and measurement values, which are obtained by changing the gain of the first power amplifier 22_2 driving the first antenna A1, while the phase shifters of the front-end module 22 are set such that the beam formed by the array antenna 21 has the n-th angle $\theta_n$. In the normal mode, the controller 23 may read correction coefficients corresponding to an angle of the beam from the memory 24 and may estimate the output power of the array antenna 21, based on the correction coefficients and output values, and thus, the output power corresponding to the angle of the beam may be accurately estimated.

Figure 12:
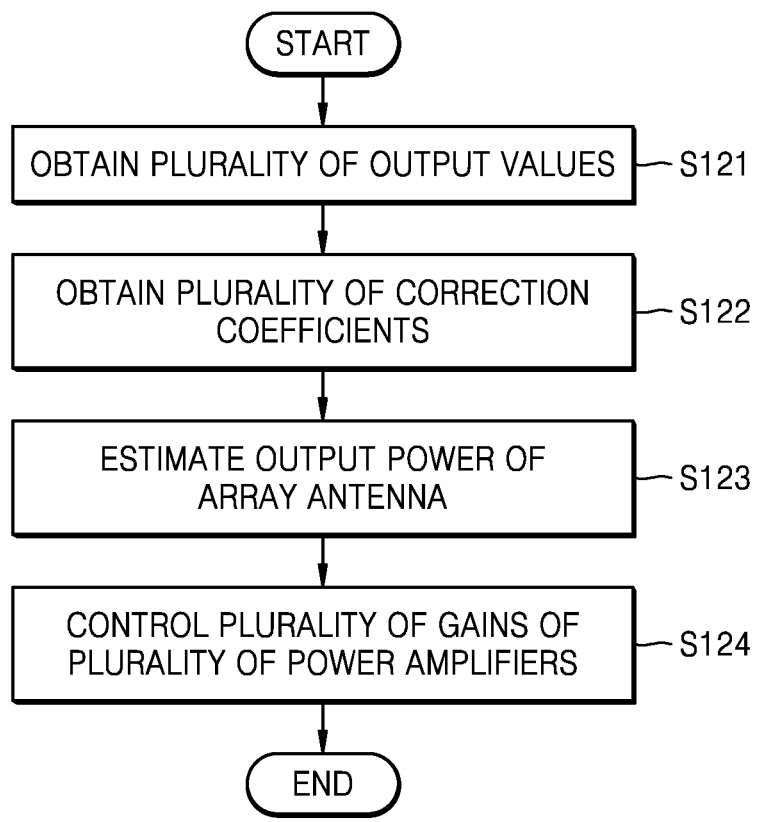
FIG. 12 is a flowchart illustrating a method of estimating output power of an array antenna, according to an example embodiment.

FIG. 12 is a flowchart illustrating a method of estimating output power of an array antenna, according to an example embodiment. Specifically, the flowchart of FIG. 12 represents the method performed by a user equipment in the normal mode. As shown in FIG. 12, the method of estimating output power of an array antenna may include a plurality of operations S121 to S124. In some embodiments, the method of FIG. 12 may be performed by the user equipment 20 of FIG. 2, and hereinafter, descriptions regarding FIG. 12 will be made with reference to FIG. 2.

Referring to FIG. 12, in operation S121, a plurality of output values may be obtained. For example, in the normal mode, the user equipment 20 may communicate with another wireless communication device (e.g., the base station 1 of FIG. 1) and may transmit a signal to the other wireless communication device through the array antenna 21. During the transmission of the signal through the array antenna 21, first to fourth power detectors may respectively detect output powers of first to fourth power amplifiers and may respectively generate detection signals. The controller 23 may identify the output powers of the first to fourth power amplifiers, based on values of the detection signals ("output values").

In operation S122, a plurality of correction coefficients may be obtained. For example, the controller 23 may read, from the memory 24, four correction coefficients respectively corresponding to the first to fourth antennas A1 to A4. In some embodiments, as described above with reference to FIG. 11, when the memory 24 stores correction coefficients corresponding to various angles of a beam, the controller 23 may identify an angle of the beam formed by the array antenna 21 and may read, from the memory 24, correction coefficients corresponding to the identified angle.

In operation S123, output power of an array antenna may be estimated. For example, the controller 23 may estimate the output power of the array antenna 21, based on the plurality of output values obtained in operation S121 and the plurality of correction coefficients obtained in S122. In some embodiments, the controller 23 may estimate an output power of the first antenna A1, based on the output value and the correction coefficient, which correspond to the first antenna A1. Similarly, the controller 23 may estimate respective output powers of the second to fourth antennas A2 to A4 and may estimate the output power of the array antenna 21 by summing the estimated output powers.

In operation S124, a plurality of gains of a plurality of power amplifiers may be controlled. For example, the controller 23 may compare the output power of the array antenna 21, which is estimated in operation S123, with target transmission power. The target transmission power may refer to a desired transmission power or a transmission power required for the communication with another wireless communication device and may be defined based on an error rate, such as a bit error rate (BER), block error rate (BLER), or the like. For example, the target transmission power may be defined by the base station 1 of FIG. 1 and provided to the user equipment 20, or may be defined by the user equipment 20. The controller 23 may compare the output power of the array antenna 21, which is estimated in operation S123, with the target transmission power. When the estimated output power is lower than the target transmission power, the controller 23 may increase the gains of the first to fourth power amplifiers. On the other hand, when the estimated output power is higher than the target transmission power, the controller 23 may decrease the gains of the first to fourth power amplifiers. Due to the accurately estimated output power of the array antenna 21, the gains of the first to fourth power amplifiers may be accurately set according to the target transmission power. As a result, power consumption by the first to fourth power amplifiers may be optimally controlled, and the transmission of signals with incorrect power levels may be prevented.

Exemplary embodiments of the inventive concept have been described herein with reference to signal arrows, block diagrams, flowcharts and/or algorithmic expressions. Each block of the block diagrams and combinations of blocks in the block diagrams, and operations according to the algorithmic expressions can be implemented by hardware (e.g., processing circuitry of controller 23 in cooperation with memory 24 accompanied by computer program instructions). Such computer program instructions may be stored in a non-transitory computer readable medium (e.g., memory 24) that can direct a computer, other programmable data processing apparatus, or other devices to function in a particular manner, such that the instructions stored in the computer readable medium produce an article of manufacture including instructions which implement the function/act specified in the block diagram.

While the inventive concept has been particularly shown and described with reference to embodiments thereof, it will be understood that various changes in form and details may be made therein without departing from the spirit and scope of the following claims.

What is claimed is:

1. A wireless communications device comprising:
   an array antenna comprising a plurality of antennas;
   a plurality of power amplifiers, including a first power amplifier configured to drive a first antenna of the plurality of antennas;
   a plurality of power detectors, including a first power detector configured to detect output power of the first power amplifier; and
   a controller configured to:
      in a calibration mode, obtain a first output value of the first power detector after setting the first power amplifier to a first gain and obtain a second output value of the first power detector after setting the first power amplifier to a second gain, while the plurality of antennas are respectively driven by the plurality of power amplifiers; and
      in a normal mode, estimate output power of the first antenna from a fourth output value of the first power detector, based on a correction coefficient calculated using the first output value and the second output value.

2. The wireless communications device of claim 1, wherein the controller, in the calibration mode, is further configured to:
   receive a first measurement value, which is generated using a measurement of the output power of the array antenna while the first power amplifier is set to the first gain, and a second measurement value, which is generated using a measurement of the output power of the array antenna while the first power amplifier is set to the second gain; and
   calculate the correction coefficient, based on the first output value, the second output value, the first measurement value, and the second measurement value.

3. The wireless communications device of claim 2, wherein the controller is further configured to:
   in the calibration mode, calculate the correction coefficient, based on a first difference between the first output value and the second output value and a second difference between the first measurement value and the second measurement value; and
   in the normal mode, calculate a product of the fourth output value of the first power detector and the correction coefficient as the output power of the first antenna.

4. The wireless communications device of claim 3, wherein the controller is further configured to, in the calibration mode:
   set the first power amplifier to a third gain, followed by obtaining a third output value of the first power detector, while the plurality of antennas are respectively driven by the plurality of power amplifiers;
   receive a third measurement value, which is generated by measuring the output power of the array antenna while the first power amplifier is set to the third gain;
   calculate a first correction coefficient, based on the first difference and the second difference;
   calculate a second correction coefficient, based on a difference between the first output value and the third output value and a difference between the first measurement value and the third measurement value; and
calculate the correction coefficient, based on the first correction coefficient and the second correction coefficient.

5. The wireless communications device of claim 1, further comprising a memory,
wherein the controller is further configured to: in the calibration mode, write the correction coefficient to the memory; and, in the normal mode, read the correction coefficient from the memory.

6. The wireless communications device of claim 5, wherein the memory stores a plurality of correction coefficients respectively corresponding to the plurality of antennas, and
the controller, in the normal mode, is further configured to: receive the plurality of correction coefficients from the memory; and estimate output power of the array antenna, based on a plurality of output values of the plurality of power detectors and the plurality of correction coefficients.

7. The wireless communications device of claim 6, wherein the controller is further configured to, in the normal mode, control a plurality of gains of the plurality of power amplifiers, based on the output power of the array antenna.

8. The wireless communications device of claim 5, wherein the memory stores a plurality of correction coefficients respectively corresponding to a plurality of angles of a beam that is formed by the array antenna, and
the controller, in the normal mode, is further configured to: read, from the memory, at least one correction coefficient corresponding to an angle of the beam from among the plurality of correction coefficients; and estimate output power of the array antenna, based on a plurality of output values of the plurality of power detectors and the at least one correction coefficient.

9. The wireless communications device of claim 1, wherein the controller, in the calibration mode, is further configured to: provide the first output value and the second output value to an external device; and receive the correction coefficient from the external device.

10. The wireless communications device of claim 1, wherein a difference between the second gain and the first gain is a step size of a gain of the first power amplifier.

11. A wireless communication method through an array antenna, the wireless communication method comprising:
in a calibration mode, controlling a plurality of power amplifiers to drive a plurality of antennas in the array antenna;
in the calibration mode, setting, to a first gain, a first power amplifier, which drives a first antenna from among the plurality of antennas, and generating a first output value by detecting output power of the first power amplifier;
in the calibration mode, setting the first power amplifier to a second gain and generating a second output value by detecting the output power of the first power amplifier;
in a normal mode, generating a third output value by detecting the output power of the first power amplifier; and
in the normal mode, estimating output power of the first antenna from the third output value, based on a correction coefficient calculated using the first output value and the second output value.

12. The wireless communication method of claim 11, further comprising:
in the calibration mode, receiving a first measurement value generated using a measurement of the output power of the array antenna while the first power amplifier is set to the first gain;
in the calibration mode, receiving a second measurement value generated using a measurement of the output power of the array antenna while the first power amplifier is set to the second gain; and
calculating the correction coefficient, based on the first output value, the second output value, the first measurement value, and the second measurement value.

13. The wireless communication method of claim 12, wherein the calculating of the correction coefficient is based on a difference between the first output value and the second output value and a difference between the first measurement value and the second measurement value, and
the estimating of the output power of the first antenna comprises calculating a product of the third output value and the correction coefficient as the output power of the first antenna.

14. The wireless communication method of claim 11, further comprising, in the calibration mode, writing the correction coefficient to a memory,
wherein the estimating of the output power of the first antenna comprises reading the correction coefficient from the memory.

15. The wireless communication method of claim 14, wherein the memory stores a plurality of correction coefficients respectively corresponding to the plurality of antennas,
and wherein the wireless communication method further comprises: in the normal mode, receiving the plurality of correction coefficients from the memory; and
in the normal mode, estimating output power of the array antenna, based on a plurality of output values, which respectively correspond to output powers of the plurality of power amplifiers, and the plurality of correction coefficients.

16. The wireless communication method of claim 15, further comprising, in the normal mode, controlling a plurality of gains of the plurality of power amplifiers, based on the output power of the array antenna.

17. The wireless communication method of claim 14, wherein the memory stores a plurality of correction coefficients respectively corresponding to a plurality of angles of a beam that is formed by the array antenna, and wherein the wireless communication method further comprises:
in the normal mode, generating a plurality of output values by detecting powers of the plurality of power amplifiers;
in the normal mode, reading at least one correction coefficient corresponding to an angle of the beam from among the plurality of correction coefficients from the memory, which stores the plurality of correction coefficients respectively corresponding to the plurality of angles of the beam that is formed by the array antenna; and
estimating output power of the array antenna, based on the plurality of output values and the at least one correction coefficient.

18. The wireless communication method of claim 11, further comprising:
in the calibration mode, providing the first output value and the second output value to an external device comprising the array antenna; and
in the calibration mode, receiving the correction coefficient from the external device.

19. A method of generating a correction coefficient used for estimating output power of an array antenna, the method comprising:

in a calibration mode:
- driving a plurality of antennas in the array antenna respectively by a plurality of power amplifiers in a device comprising the array antenna;
- setting a first power amplifier from among the plurality of power amplifiers to respectively a first gain and a second gain;
- obtaining a first output value and a second output value respectively corresponding to the first gain and the second gain by detecting output power of the first power amplifier;
- obtaining a first measurement value and a second measurement value respectively corresponding to the first gain and the second gain by measuring output power of the array antenna;
- calculating a correction coefficient, based on the first output value, the second output value, the first measurement value, and the second measurement value; and
- storing the correction coefficient in the device.

20. The method of claim 19, wherein the calculating of the correction coefficient is based on a difference between the first output value and the second output value and a difference between the first measurement value and the second measurement value.

* * * * *